June 25, 1957  F. SCHNUR ET AL  2,797,151
APPARATUS FOR PRODUCING NITRIC ACID
Original Filed Sept. 30, 1949  4 Sheets-Sheet 2
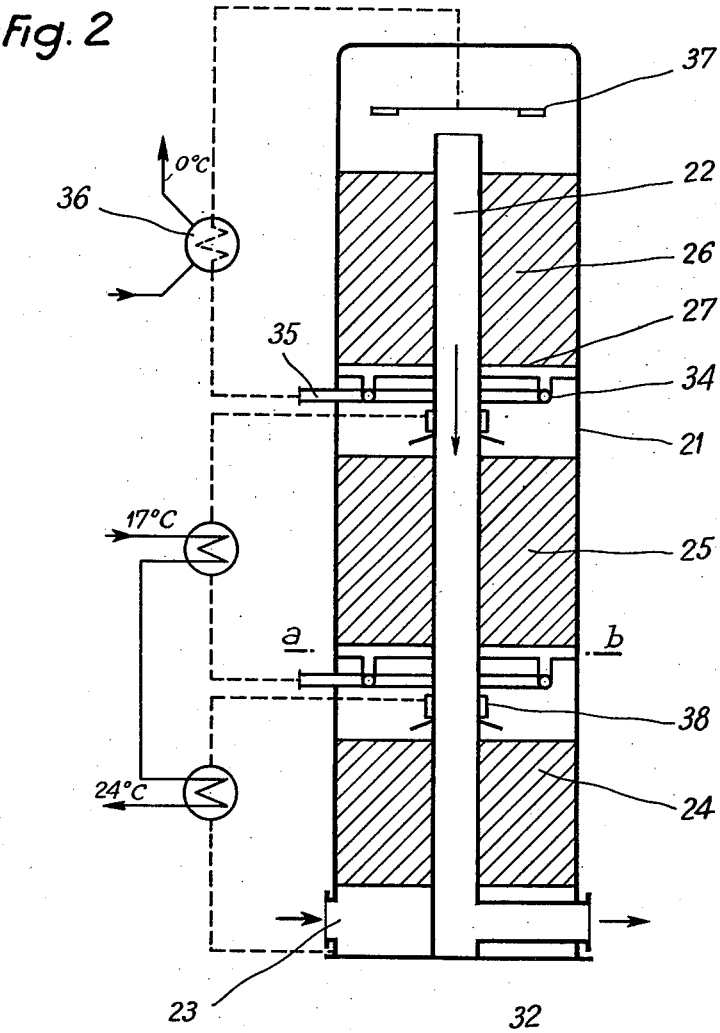
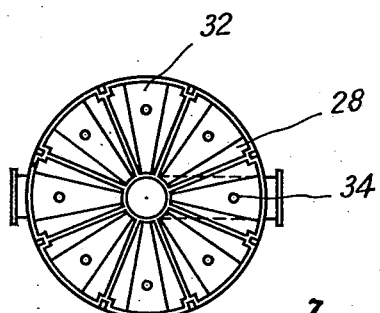
Inventors
Friedrich Schnur, Aloys Krauss and
Franz Schaub
by Karl Michaelis, atty.

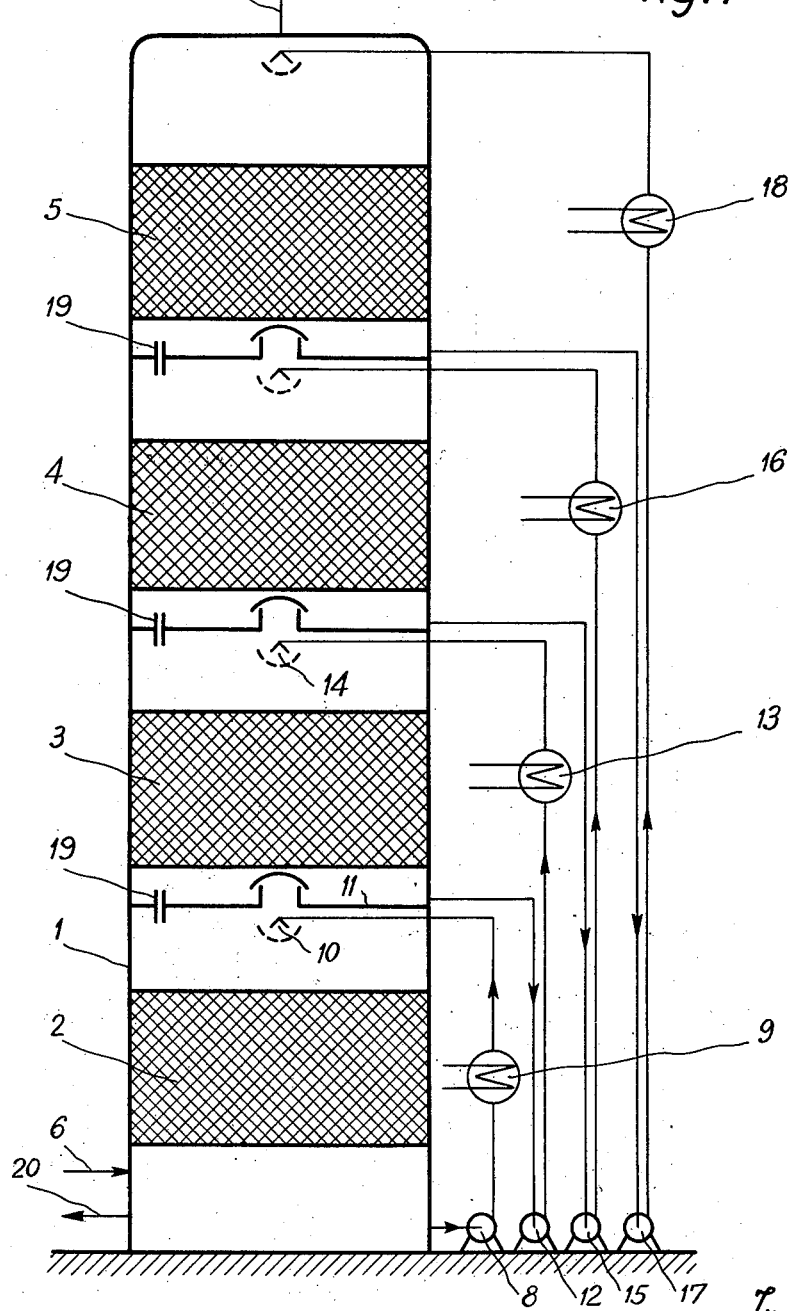

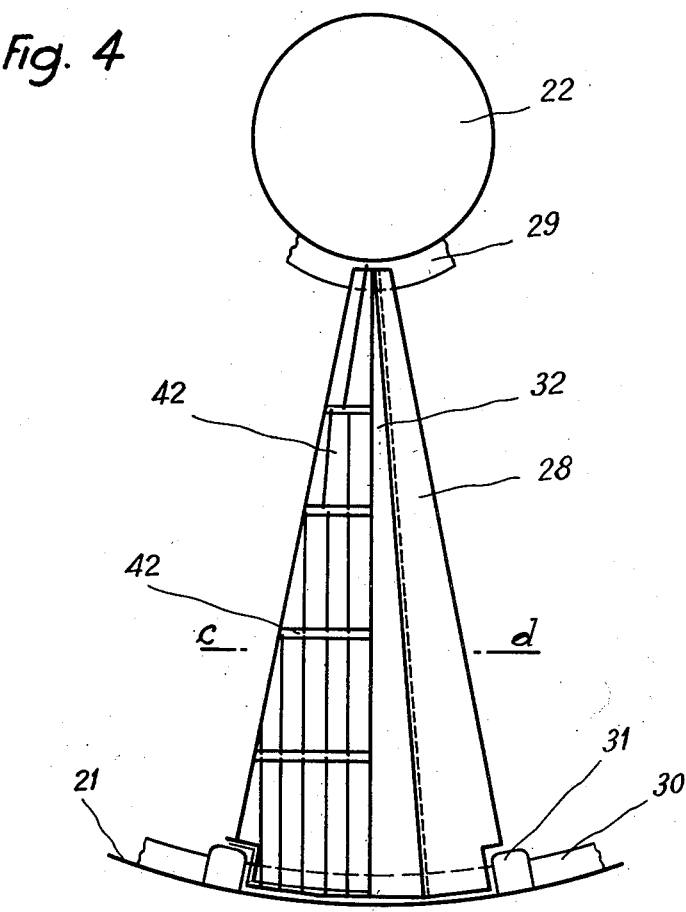
Fig. 4
Fig. 5
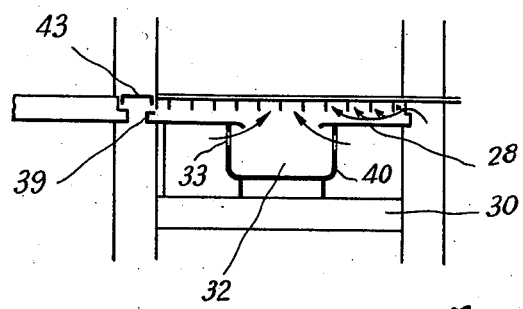

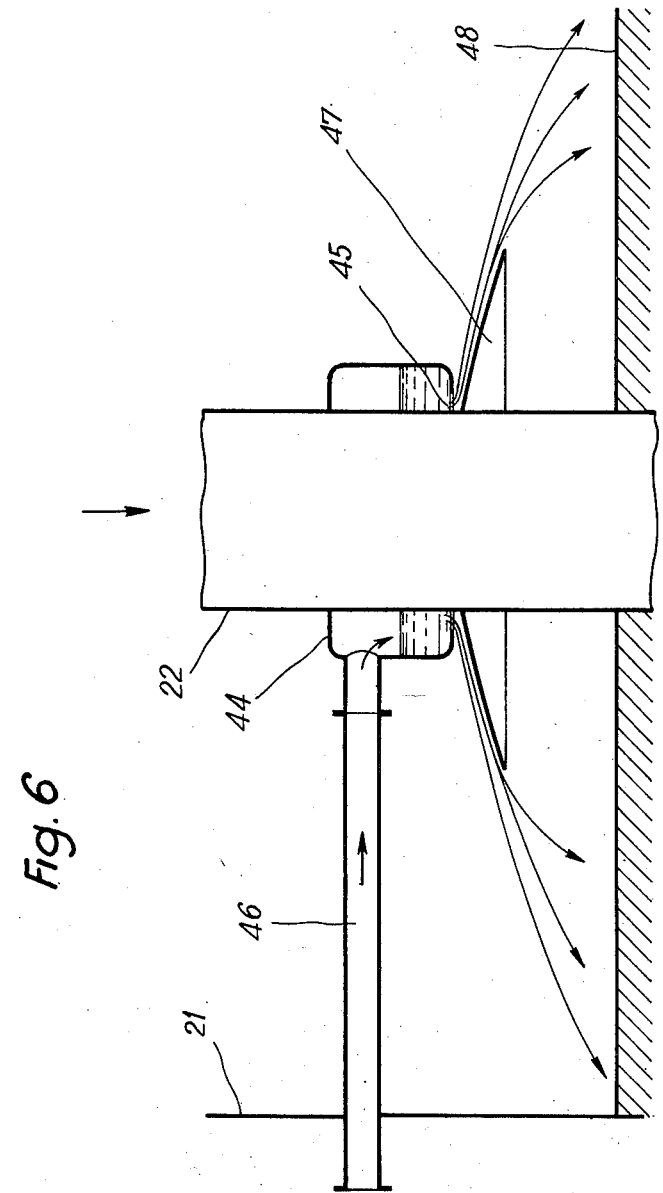

2,797,151
APPARATUS FOR PRODUCING NITRIC ACID

Friedrich Schnur and Aloys Krauel, Oberhausen-Sterkrade, and Franz Schaub, Duisburg-Hamborn, Germany, assignors to Ruhrchemie Aktiengesellschaft, Oberhausen-Holten, Germany, a corporation of Germany Original application September 30, 1949, Serial No. 118,893. Divided and this application July 18, 1952, Serial No. 299,664

Claims priority, application Germany October 1, 1948

4 Claims. (Cl. 23—283)

This invention relates to the industrial production of nitric acid and more particularly to apparatus particularly adapted for the carrying out of the steps of oxidation of nitrous compounds and to the absorption of the nitrogen oxides formed by water and/or aqueous solutions of such oxidation products, as described in our copending application for patent Serial No. 118,893, and now abandoned of which the present application is a division.

The invention is of particular interest for the large scale manufacture of nitric acid from nitrous gases and more especially from the gases obtained in the catalytic combustion of ammonia.

It is an object of this invention to improve the manner of oxidizing and absorbing nitrogen oxides in view of an improvement of the oxidation and absorption methods hitherto used for this purpose.

As is well known to those skilled in the art, the production of nitric acid from nitrous gases such as are obtained for instance in the catalytic combustion of ammonia, requires an oxidation of these gases and their absorption in water or an aqueous solution already containing nitrogen oxides. In this process the nitric oxide (NO) has to be converted into nitrogen dioxide ($NO_2$). By absorption of the nitrogen dioxide in water, nitric oxide is formed and in this process, according to the equation

$$3NO_2 + H_2O = 2HNO_3 + NO$$

nitric oxide is formed, besides the nitric acid, and this nitric oxide has to be subjected once more to oxidation.

In the large scale manufacture of nitric acid the oxidation and absorption of the nitrous gases has hitherto been carried through in acid towers or columns, in which the absorbing liquid, which is water or a dilute acid solution, starting at the top of the tower uniformly trickles through a plurality of layers of packing material, being collected at the bottom of the tower in a collecting vessel, from which it is lifted by a pump, after having been duly cooled, back to the top of the tower. The nitrous gases are introduced into the bottom section of the column of packing material and rise in counter-current to the absorbing liquid to be sucked off in the top section of the tower. The liquid in excess in one tower is transferred to the absorbing liquid circulation in the preceding tower of a row of towers. From the first tower of the row the liquid in excess is withdrawn in the form of concentrated nitric acid which is the desired final product.

The use of wide-roomed oxidation and absorption columns or towers of the kind hitherto in use for the manufacture of nitric acid involves the drawback, that within these towers the nitrogen oxidation products are partly re-formed into nitric oxide (NO). If the nitric acid is produced from the gases resulting in the combustion of ammonia, and these gases are cooled sufficiently and, if necessary, are admixed with air or oxygen, about 25 to 30 percent only of the NO present in the gas mixture entering near the bottom of the tower are oxidized to $NO_2$. When the gases arrive at the top of the tower, approximately 85 to 90 percent of them have been converted into $NO_2$. The absorbing liquid circulating in the tower, whose volume is constantly increased by the water of condensation in the gases and by other supplies of liquid, is contacted near the top of the tower with highly oxidized gases, while near the bottom of the tower it meets gases which have only reached a low degree of oxidation. In consequence thereof, the absorption liquid absorbs near the head of the tower $NO_2$, while retaining NO. Near the bottom of the tower it absorbs NO and releases $NO_2$, which is undesirable. Under these circumstances the actual percentage of $NO_2$ in the absorption liquid (water or dilute nitric acid) only reaches a value which approximately corresponds to the percentage of NO in the circulating gases as prevailing in the middle between the top and the bottom of the tower. This is the reason why in the oxidation towers hitherto in use the concentrations of acid obtainable were always lower than should have been expected in view of the large space afforded by the tower.

Similar conditions obtained in the absorption of the nitrogen dioxide ($NO_2$) formed by oxidation of nitrous gases, i. e. the formation of $HNO_3$ itself. Here the ratio of $NO_2$ to NO present in the gases is of importance. In the high acid towers hitherto in use, in which circulates the same body of absorption liquid from the top to the bottom, the difference in the ratio of $NO_2$ to NO between the top part and the bottom part of the tower is so great that the acid withdrawn near the bottom of the tower does no by far attain the concentration of $HNO_3$ which might be expected in view of the combustion of the nitrous gases entering the tower, but approximately corresponds only to the ratio of $NO_2$ to NO prevailing near the middle or in the top half of the tower.

We have now found, that in the oxidation and absorption of nitrous gases a more favorable utilization of the inner volume of the tower and also a higher concentration of the nitric acid solutions formed therein can be obtained, if, in accordance with our invention, the tower is subdivided into a number of superposed, self-contained oxidation and absorption compartments, each of which is operated with a liquid circulation of its own. The height of the individual superposed circulation compartments within the tower needs only to be so adjusted that within each compartment the degree of oxidation as well as the relative ratio of $NO_2$ to NO in the nitrous gases rising in the compartments varies only little. Even if the $HNO_3$-concentration of the individual circulation compartments only corresponds to the conditions of oxidation in the middle section of each compartment, the sum of the mean values of several consecutive compartments in a tower will present a more favorable oxidation and absorption result, than hitherto obtainable with a liquid circulation extending in a single step throughout the whole interior of the tower.

If in an individual case merely an oxidation of the nitrous gases is to be obtained, it will be particularly advantageous to so choose the height (vertical dimension) of the several tower compartments operated with liquid circulations of their own that the compartments and the layers of packing material in them are lower near the bottom of the tower than those near the top. In that case it is preferable to subdivide the inner space of the tower in such manner that the superposed compartments present a greatly increased height, whereby near the top of the tower, where the oxidation of nitrous gases proceeds comparatively slowly, longer reaction periods are offered than near the bottom of the tower.

In the operation of our invention absorption towers of circular, rectangular or polygonal cross-section may be used. Absorption towers of the well-known kind provided with a centrally arranged suction pipe for the gases escaping from the tower are adapted to be used in the process. The subdivision of the interior of the tower into a number of superposed absorption and oxidation compartments requires the provision of an intermediate bottom for the support of the layers of packing material in each compartment. This bottom, apart from supporting the weight of the packing material, also serves for collecting the absorption liquid which trickles down, while offering to the gases rising in this layer sufficient cross-sectional areas of passage.

The intermediate bottoms can be rendered particularly useful in towers provided with a central gas suction pipe. In this case the superposed oxidation and absorption compartments will have an annular cross-section and will encircle the central gas suction pipe, while the bottoms are subdivided into segments, each of which is supported by the outer wall of the tower and by the central pipe. In this arrangement of the compartments the circulating liquid is preferably fed to the compartment from an annular chamber surrounding the central suction pipe, and the bottom of this chamber is formed with an annular slit, through which absorption liquid flows onto a conical distributing body, thereby insuring uniform distribution of the liquid over the layer of packing material.

We have found that an apparatus constructed substantially as outlined hereabove is particularly well adapted for the operation of the process of producing nitric acid described and claimed in our copending application identified above which comprises the steps of successively acting on a substantially vertically rising current of a gas mixture containing nitrogen oxides with a plurality of separate, individually cooled bodies of circulating oxidizing and absorbing liquid, allowing part of each body of liquid to descend and mingle with another one of said bodies of liquid and separately collecting the rising gas and the descending liquors.

In the drawings affixed to this specification and forming part thereof, several embodiments of apparatuses adapted to serve in the operation of our invention are illustrated diagrammatically by way of example.

In the drawings:

Fig. 1 is a vertical section of an oxidation and absorption tower according to our invention, the liquid circulations being indicated schematically.

Fig. 2 is a similar view of a modified form of a tower provided with a central gas suction pipe.

Fig. 3 being a horizontal section on the line III—III in Fig. 2.

Fig. 4 is a plan view, drawn to a larger scale, of one of the segments which form the bottom of a compartment, Fig. 5 being a vertical section on the line V—V in Fig. 4.

Fig. 6 is a vertical section of the parts serving for the distributing of the liquid in a compartment.

Referring to the drawings and first to Fig. 1, 1 is the outer wall of a tower according to our invention, and 2, 3, 4, 5 are four compartments each containing a layer of packing material. 6 is the point at which the nitrous gases enter the tower and 7 indicates the pipe through which the gases escaping from the tower are led into other towers of the series of towers forming an oxidation and absorption unit.

Underneath the layer 2 of packing material the liquid which has trickled down through this layer, is exhausted by means of a pump and forced into a cooler 9 and from the cooler into the distributing device 10 which distributes the liquid once more over the packing material layer 2.

Underneath the layer of packing material 3 a bell bottom 11 is arranged on which collects the liquid trickling through the layer. Here again a pump 12 forces the liquid collecting on the bottom 11 back through a cooler 13 to the distributing device 14.

The layers of packing material 4 and 5 are continuously supplied with circulating liquid of their own by means of pumps 15 and 17 and coolers 16 and 18, respectively.

From each bell bottom arranged underneath each packing material layer the liquid collecting on the bottom escapes through an overflow pipe 19 to flow through the layer of packing material in the compartment below, ultimately reaching the bottom compartment, from which the highly concentrated nitric acid is exhausted by means of the pipe 20.

It is preferable as a rule to operate the liquid circulation in the upper compartments at a lower temperature than in the lower ones. One may for instance feed the coolers 18 and 16 with a refrigerant which has been cooled down in a refrigerating device so far that it enters the compartment with a temperature of 4° C., escaping therefrom with a temperature of about 10° C. The cooling devices 9 and 13 connected with the compartments nearer the bottom of the tower are supplied with plain water. Instead of this one may supply to the lower coolers 13 and 9 also the refrigerant used in the upper coolers 18 and 16.

The subdivision of the oxidation and absorption towers into several superposed compartments with the liquid circulation and gas absorption operated in separate stages offers the advantage of enabling stronger acid to be obtainable with towers of lesser volume than those hitherto in use. An acid tower according to this invention will enable an acid of 51 percent $HNO_3$ to be obtained, as compared with a tower of equal volume operated in the manner hitherto known, in which only an acid containing 48 percent $HNO_3$ could be produced. It is important to note that it has always been considered particularly difficult to obtain an acid of a concentration higher than 48 percent $HNO_3$.

Since the individual layers of packing material are operated, according to this invention, with separate liquid circulations, there must be provided underneath each layer an intermediate bottom on which the circulating liquid can be collected in order to be sucked off by a pump and forced through a cooler to the distributing device above the layer of packing material. These intermediate bottoms serving to collect the liquid may at the same time support the layer of packing material.

When operating with a central exhaust for the gases, the tower, as illustrated in Fig. 2, has an outer wall 21 and a large, centrally arranged gas pipe 22 for the exhaust of the gases entering the bottom section of the tower at 23. Within the tower are arranged three layers of packing material 24, 25 and 26 and underneath each layer is arranged an intermediate bottom 27 consisting of a number of wedge-shaped segments 28 (Fig. 3). The inner end of each segment 28 rests on a ring segment 29 (Fig. 4) mounted on the gas pipe 22, while at its outer end it rests on a supporting ledge 30 mounted on vertical supports 31 which also serve for reinforcing the outer wall of the tower.

Underneath each bottom segment 28 is arranged a segment trough 32 (Fig. 5) extending over the entire length of the bottom and formed with a great number of lateral openings 33 affording a passage for the gases rising in the tower. Each trough is also provided with an overflow pipe 34 through which the liquid can flow into an annular collecting pipe 35 (Fig. 2) and from there to a pump which forces the liquid through a cooler 36 onto a distributing device 37 or 38. From this device the liquid is distributed over the layer of packing material to start a fresh circulation through it. The bottom segment 28 is formed with reinforcing edges 39 (Fig. 5). The carrying capacity of the segments 28 and of the intermediate bottoms 27 is materially increased by the side walls 40 of the troughs 32 below them which are fixedly supported at both ends by the ledges 23 and 30.

On the top side of the bottom segments 28 there may be provided ledges 41 (Fig. 4) which support rods 42 forming a supporting grid for the packing material. If desired, a perforated plate (not shown) may be placed on top of these rods.

The radial edges 39 of adjacent bottom segments are covered by strips 43 which prevent the liquid from flowing off the segments 28 without collecting in the troughs 32.

Since nitrous gases have a strong corrosive action, packing material of ceramic material is preferable in the oxidation and absorption towers. The considerable weight of this material requires intermediate bottoms of high carrying capacity for the superposed compartments. These bottoms should therefore be made of acid-proof alloyed steel (for instance chromium-nickel steel). Owing to their segment shape and to the reinforcing edges 39 and 40, the segmental bottoms according to this invention have a very high load carrying capacity, while requiring comparatively little steel material in their construction.

In the individual superposed circulation compartments the absorption liquid must be distributed uniformly over the layers of packing material. This requirement creates certain difficulties, because the vertical dimensions of the spaces between the several layers are comparatively low. If the tower is provided with an inner gas suction pipe, the necessity of distributing the liquid over a large annular cross-sectional area increases these difficulties.

We succeed according to this invention in overcoming these difficulties by means of the device illustrated in Fig. 6, where 21 is the outer wall of the tower and 22 the central gas suction pipe. This pipe is surrounded in each compartment by a ring-shaped vessel 44 which is fixed at its top to the pipe 22 in a liquid-tight manner, while at its bottom it is formed with a comparatively narrow annular slit 45 uniformly surrounding the pipe 22. A feed pipe 46 extending through the outer wall 21 of the tower feeds the liquid to the vessel 44, from which it flows through the slit 45 onto a conical deflecting head 47 which may be formed with perforations and projections serving for uniformly distributing the liquid over the entire surface of the layer of packing material below.

We wish it to be understood that we do not desire to be limited to the details of proceeding and construction described in this specification and illustrated in the drawings, for obvious modifications will occur to a person skilled in the art.

We claim:

1. An apparatus for the manufacture of nitric acid by the absorption of nitrous gases in a liquid comprising a tower having several packed compartments arranged in superposition, a bottom inlet for the gases to be absorbed, a gas suction pipe positioned within said tower and traversing said superposed compartments, the pipe having an open top extending above the uppermost layer of packing and having an outlet for exhaust gases at its bottom, an inlet for the absorbing liquid, and a bottom outlet for the nitric acid, means for recycling liquid collecting at the bottom of each compartment in that same compartment and individual cooling means adapted to permit individual control of cooling temperatures in the recycling means of each compartment, collar-like vessels surrounding said pipe at the top of each compartment except the uppermost compartment, an annular opening in the bottom of each such vessel in proximity to said pipe, and inlet pipes traversing the wall of said tower and opening into each vessel.

2. The apparatus of claim 1 including in addition a truncated conical deflecting member surrounding said pipe underneath each vessel bottom and extending over a minor portion of said compartment and inlet pipe traversing the wall of the tower and opening into each vessel, whereby to distribute absorbing liquid throughout said compartments.

3. The apparatus of claim 1, in which the respective compartments comprise substantially horizontal packing supporting partitions, said bottoms being subdivided into segments, with abutments on the interior wall of the tower and on the outside of the suction pipe supporting the outer and inner ends of said bottom segments, respectively.

4. The apparatus of claim 1, in which the respective compartments comprise substantially horizontal packing supporting partitions with intermediate bottoms underneath said partitions, said bottoms being divided into segments, troughs underneath each segment, openings in said troughs to afford passage to the gases rising in the tower, said troughs including overflow pipes, and an annular collecting pipe connecting the overflow pipes of any one bottom, whereby to return liquid for recycling in the same compartment.

References Cited in the file of this patent

UNITED STATES PATENTS

| 1,387,170 | Poindexter | Aug. 9, 1921 |
| 2,027,578 | De Jahn | Jan. 14, 1936 |
| 2,098,953 | Christensen | Nov. 16, 1937 |
| 2,132,663 | Voogd | Oct. 11, 1938 |
| 2,206,495 | Beardsley | July 2, 1940 |
| 2,384,874 | Barr | Sept. 18, 1945 |

FOREIGN PATENTS

| 315,629 | Great Britain | July 18, 1929 |